July 10, 1934.　　　L. W. BLAU　　　1,966,112
STRING GALVANOMETER
Filed April 9, 1932　　　2 Sheets-Sheet 1
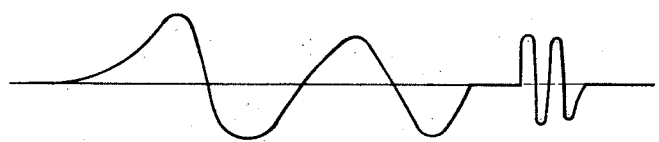
Fig.-1
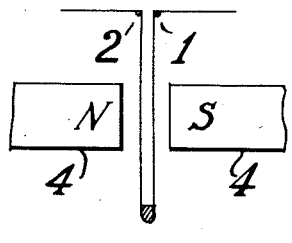　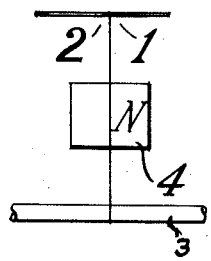　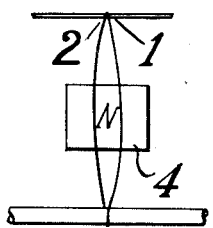
Fig.-2　　　Fig.-3　　　Fig.-4
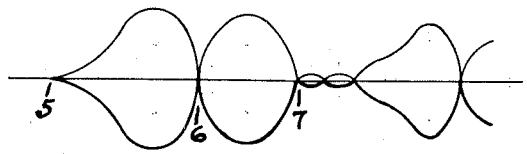
Fig.-5
Ludwig W. Blau INVENTOR.
BY
W. E. Currie ATTORNEYS.

July 10, 1934.    L. W. BLAU    1,966,112
STRING GALVANOMETER
Filed April 9, 1932    2 Sheets-Sheet 2

Ludwig W. Blau INVENTOR.

BY

W. E. Currie ATTORNEYS.

Patented July 10, 1934

1,966,112

UNITED STATES PATENT OFFICE 1,966,112

STRING GALVANOMETER

Ludwig W. Blau, Houston, Tex., assignor to Standard Oil Development Company, a corporation of Delaware Application April 9, 1932, Serial No. 604,340

9 Claims. (Cl. 171—95)

This invention relates to an improvement in "string" galvanometers of the Einthoven type and will be fully understood from the following description when read in conjunction with the drawings.

Figure 1 of which represents the indications of a variable current on a photographic film when a usual Einthoven string galvanometer is used for measuring the current.

Figure 2 is a diagrammatic vertical section showing the principal parts of a galvanometer according to the present invention.

Figures 3 and 4 are vertical sections at right angles to that of Figure 2 showing the galvanometer of the present invention with the threads in the undeflected and in the deflected positions, respectively.

Figure 5 represents the indication of a variable current on a photographic film when a galvanometer of the present invention is used.

Figure 7:
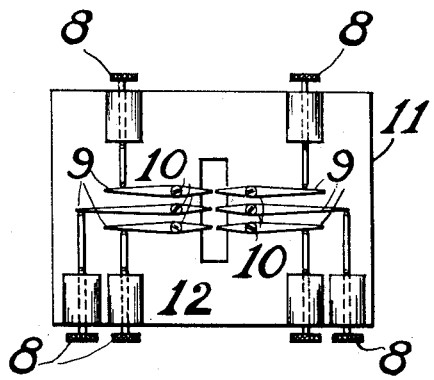
Figure 7 is a top view of the galvanometer illustrated in Figure 6.

The Einthoven string galvanometer consists of a metallic wire stretched between the poles of a strong magnet. A current passing through the wire causes deflection of the same due to the mutual force between the current and the magnetic field. Instead of a metallic wire a silvered quartz fiber may be used. The deflections are either observed through a microscope focused on the wire or a beam of light is thrown upon a moving photographic film in a direction perpendicular to the plane of oscillation of the wire; the wire then throws a shadow upon the film and after developing of the film the trace of the wire can be seen upon it.

It is often necessary when recording vibrations of very different frequencies to employ a rather high film speed so as to permit investigation of the high frequencies. The low frequencies are then very much drawn out, rendering the accurate determination of the time of onset difficult. These conditions are illustrated in Figure 1, the left hand of which shows a film picture of a low frequency current while the right hand side shows a picture of a high frequency current.

I have discovered that by using a double thread galvanometer through the thread of which the current passes in opposite directions between the poles of the magnet, the accurate determination of the time of arrival of waves is greatly facilitated whether the same are of low or of high frequency.

Figure 2 illustrates the principle of my invention. In this figure the numerals 1 and 2 designate the two branches of the double thread which is passed around bar 3 and held in tension between the poles of a magnet 4, the two poles of which are designated by N and S, respectively. When an electric current is sent through the double wire one branch of it will be deflected out of the plane of the paper while the other branch will be deflected in the opposite direction.

In Figure 3 may be seen the picture of the two threads in the undeflected position, the one being covered by the other.

Figure 4 shows the two threads when deflected by the passage of current.

It is seen that if the shadow of the undeflected double wire is thrown upon a film a single straight line results and if the shadow of the deflected string is photographed, there will be two lines as shown in Figure 5. The point 5 marking the time of arrival of the wave is now determined with greatly increased accuracy. A further advantage of the invention lies in the fact that the points where the two lines corresponding to the two branches of the double thread cross, such as points 6, 7, etc., lie on the line which would be given by the undeflected thread so that these points afford an easy means of drawing the line from which the amplitudes are measured.

Any desired number of double threads may be installed in a single galvanometer, as it will be illustrated in Figures 6–9.

Figure 6:
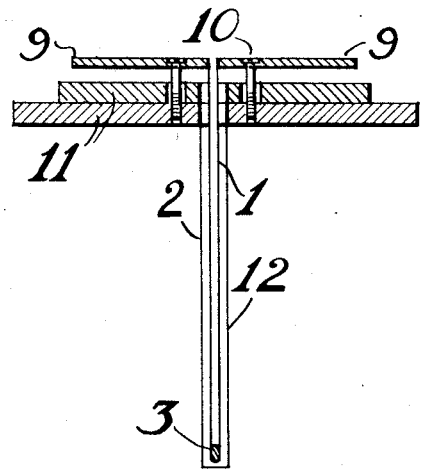
Figure 6 is a partial vertical section through the improved galvanometer as in Figure 2 showing in detail the supports for the threads and the means for adjusting its tension.

The details of the supports for the double thread and the means for adjusting its tension are shown in Figures 6–7. The numerals 8 in Figure 7 designate the adjusting screws connected with levers 9, which can be rotated about the adjustable screws 10, to which the two ends of the double thread are attached. By means of the adjusting screws 8 and levers 9, the lateral position of the double threads can be regulated. The adjustable screws 10 permit the variation of the tension of the double thread, the lower ends of which are passed around the bakelite bar 3. The adjusting elements are mounted on a bakelite plate 11 which is shown in the figure as made up of two pieces, although a one piece plate may also be used. The plate 11 is fixedly mounted on the magnet by means well known in the art (not shown). The double threads are enclosed in a casing 12 with an appropriate opening for observation and/or photographic purposes.

Figure 9:
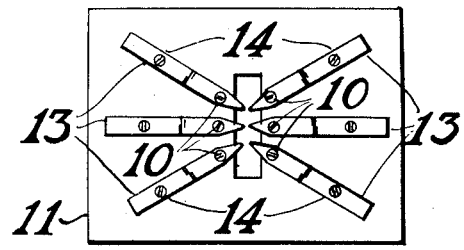
Fig. 9 is a top view of the galvanometer shown in partial section in Figure 8.
Figure 8:
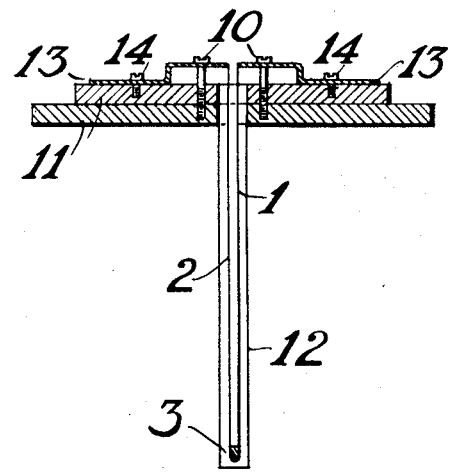
Figure 8 is a partial vertical section as in Figure 6 showing another form of the galvanometer.

Figures 8-9 show a somewhat modified form of the apparatus. As shown in these figures the double threads are attached to fingers 13 consisting of thin pieces of phosphor bronze held on plate 11 by means of screws 14. Adjustable screws 10 serve for the regulation of the tension of the double threads. This modification of the invention does not allow a ready lateral adjustment of the double threads.

Since my invention may be varied in many different ways the same is not to be limited by the particulars given for the purpose of illustration but merely by the attached claims in which it is my intention to claim all novelty inherent in the invention.

What I claim is:

1. The method of recording or directly observing the effect of successive pulsations of electric energy, which comprises passing the pulsations through a looped conductor in a magnetic field to cause the legs of the loop to be deflected intermittently in opposite directions, and recording or directly observing the changing positions of each leg of the loop.

2. The method of recording or directly observing the effect of successive pulsations of electric energy, which comprises passing the pulsations through parallel legs of a looped structure in a magnetic field to cause the legs of the loop to be deflected intermittently in opposite directions, and recording or directly observing the changing positions of each leg of the loop.

3. The method of recording or directly observing the effect of successive pulsations of electric energy, which comprises passing the pulsations through parallel legs of a looped conductor in a magnetic field to cause the legs of the loop to be deflected intermittently in opposite directions in equal amplitudes for each deflection, and recording or directly observing the changing positions of each leg of the loop from a position at right angles to the plane of the deflections.

4. The method of recording the effect of successive pulsations of electric energy, which comprises passing the pulsations through legs of a looped conductor disposed in a common plane in a magnetic field to cause the legs of the loop to be deflected intermittently in opposite directions out of the plane, and throwing the shadow of the legs parallel with said plane upon a travelling film to record the image of the legs.

5. The method of recording the effect of successive pulsations of electric energy, which comprises passing the pulsations through legs of a looped conductor disposed in a common plane in a magnetic field to cause the legs of the loop to be deflected intermittently in opposite directions at right angles to the plane, and throwing the shadow of the legs parallel with said plane upon a travelling film to record the image of the legs.

6. The method of recording the effect of successive pulsations of electrical energy, which comprises passing the pulsations through legs of a looped conductor disposed under equal tension in a common plane in a magnetic field to cause the legs of the loop to be deflected intermittently in opposite directions out of the plane, and throwing the shadow of the legs parallel with said plane upon a travelling film to record the image of the legs.

7. In a galvanometer, means for creating a magnetic field, a looped conductor having legs of the loop supported to extend into the field in a common plane, means for passing successive pulsations of electric energy through the conductor whereby the legs are intermittently deflected in opposite directions, and means for recording the deflections of both legs simultaneously.

8. In a galvanometer, means for creating a magnetic field, a looped conductor having the legs of the loop supported to extend into the field in a common plane, means for passing successive pulsations of electric energy through the conductor whereby the legs are intermittently deflected in opposite directions out of the plane, a film, and means parallel with the plane of the legs for throwing the shadows of the legs upon the film whereby the position of the legs is recorded.

9. In a galvanometer, means for creating a magnetic field, a looped conductor having the legs of the loop supported to extend into the field in a common plane, means for passing successive pulsations of electric energy through the conductor whereby the legs are intermittently deflected in opposite directions at right angles to the plane, a film, and means substantially parallel with the plane of the legs for throwing the shadows of the legs upon the film whereby the position of the legs is recorded.

LUDWIG W. BLAU.